United States Patent [19] [11] 3,901,932
Tada et al. [45] Aug. 26, 1975

[54] NOVEL SULFUR-CONTAINING ORGANIC PHOSPHORUS COMPOUNDS AND THEIR PRODUCTION AND USE

[75] Inventors: Fusao Tada; Tadashi Koga, both of Osaka; Shizuo Inaba, Yokohama; Keiji Sakata, Osaka; Tutomu Hatanaka, Osaka; Shoji Nobata, Osaka, all of Japan

[73] Assignees: Sakai Chemical Industry Co. Ltd., Sakai; Showa Oil Company, Ltd., Tokyo, both of Japan

[22] Filed: Apr. 11, 1974

[21] Appl. No.: 459,985

[30] Foreign Application Priority Data
Apr. 11, 1973 Japan.............................. 48-041734

[52] U.S. Cl.............. 260/455 P; 252/46.6; 260/953
[51] Int. Cl.².................................... C07C 154/00
[58] Field of Search................... 260/455 B, 455 P

[56] References Cited
UNITED STATES PATENTS

| | | | |
|---|---|---|---|
| 2,381,483 | 8/1945 | Blake et al. | 260/455 B |
| 2,665,291 | 1/1954 | Fischback | 260/455 B |
| 2,691,635 | 10/1954 | Harris et al. | 260/455 B |
| 2,786,009 | 3/1957 | Pianfetti et al. | 260/455 B |
| 2,813,890 | 11/1957 | Cyphers et al. | 260/455 B |
| 2,839,561 | 6/1958 | Schrader | 260/455 B |
| 2,861,913 | 11/1958 | Wegler et al. | 260/455 B |
| 3,004,980 | 10/1961 | Schrader | 260/455 P |
| 3,180,791 | 4/1965 | Rossi | 260/455 B |
| 3,470,229 | 9/1969 | Schrader et al. | 260/455 P |

*Primary Examiner*—Lewis Gotts
*Assistant Examiner*—D. R. Phillips

[57] ABSTRACT

A sulfur-containing organic phosphorus compound of the formula:

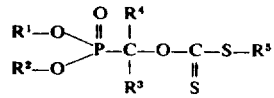

which is useful as an additive to lubricating oils and can be produced by the reaction of a compound of the formula:

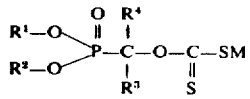

with a hydrocarbon group-introducing agent [wherein $R^1$, $R^2$ and $R^5$ are each a hydrocarbon group, $R^3$ and $R^4$ are each a hydrogen atom or a hydrocarbon group and M is an alkali metal].

19 Claims, No Drawings

NOVEL SULFUR-CONTAINING ORGANIC PHOSPHORUS COMPOUNDS AND THEIR PRODUCTION AND USE

The present invention relates to novel sulfur-containing organic phosphorus compounds and their production and use. More particularly, it relates to sulfur-containing organic phosphorus compounds useful as additives to lubricating oils, lubricating compositions containing them and their preparation.

Recently, there has been an increasing demand for highly efficient mechanical units, and such demand is met by development of mechanical engineering, metallurgical technology progress and level up of machining accuracy. Then, higher power transmitted by compact units results in higher rotational and sliding speed and higher contact pressure on machine elements. A need for improved lubrication and lubricants is thus increased.

In general, lubricants for engines, power transmission units and the like are required to have a property preventing the seizure and wear of machine elements exposed to high contact pressure. They are also required to be hardly oxidized or decomposed so as to maintain good performances for a long period of time. In order to obtain such lubricants, various chemical ingredients such as oxidation inhibitors, corrosion inhibitors, rust inhibitors, anti-wear additives, extreme pressure additives, viscosity index improvers, pour point depressants and antifoaming agents are incorporated into refined base fluids to provide them with excellent performance characteristics.

A main object of the present invention is to provide new chemical compounds. Another object of this invention is to provide methods of preparing the new chemical compounds. Another object of the invention is to provide additives for lubricating compositions. A still other object of the invention is to provide new lubricating compositions.

The sulfur-containing organic phosphorus compounds (hereinafter referred to as "S-containing organic phosphorus compounds") of the invention are representable by the formula:

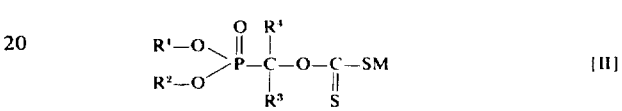

wherein $R^1$, $R^2$ and $R^5$ are each a hydrocarbon group and $R^3$ and $R^4$ are each a hydrogen atom or a hydrocarbon group.

As the hydrocarbon group, the one having not more than 12 carbon atoms is favorable. Specific examples are as follows: alkyl (e.g. methyl, ethyl, propyl, isopropyl, butyl, isobutyl, pentyl, hexyl, 1-isobutylethyl, octyl, 2-ethylhexyl), alkenyl (e.g. allyl, crotyl), cycloalkyl (e.g. cyclopentyl, cyclohexyl), cycloalkenyl (e.g. cyclopentenyl, cyclohexenyl), aralkyl (e.g. benzyl, phenethyl), aryl (e.g. phenyl, tolyl, naphthyl), etc.

Preferred examples of the hydrocarbon group represented by the symbols $R^1$ and $R^2$ are alkyl and cycloalkyl. For the hydrocarbon group represented by the symbols $R^3$ and $R^4$, preferred are alkyl and alkenyl. For the symbol $R^5$, alkyl, alkenyl, cycloalkyl, aralkyl and aryl are preferred examples of the hydrocarbon group.

The S-containing organic phosphorus compound [I] may be produced, for instance, by reacting a compound of the formula:

$$R^1-O\underset{R^2-O}{\overset{}{>}}P\underset{R^3}{\overset{O\ \ R^4}{\underset{|}{\overset{||\ \ |}{-C-O-C-SM}}}}\ \ \ \ [\text{II}]$$

wherein M is an alkali metal and $R^1$, $R^2$, $R^3$ and $R^4$ are each as defined above with a hydrocarbon group-introducing agent.

The starting compound [II] is obtainable, for example, by reacting a phosphite compound with a carbonyl compound and reacting the resulting phosphonate compound with carbon disulfide and an alkali metal hydroxide as shown in the following scheme:

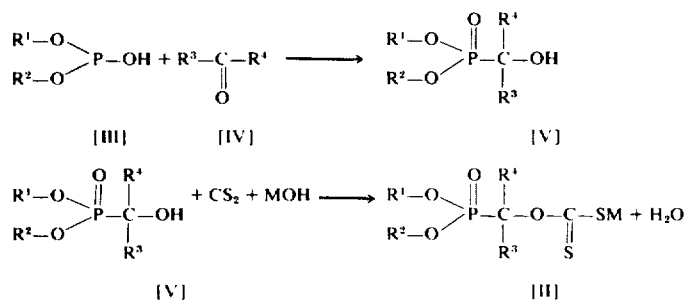

wherein $R^1$, $R^2$, $R^3$, $R^4$ and M are each as defined above.

Namely, the phosphite compound [III] is reacted with the carbonyl compound [IV] in an approximately equimolar ratio at a temperature of 60° to 150°C (preferably of 80° to 120°C) for a period of 1 to 3 hours (about 2 hours in most cases) to give the phosphonate compound [V]. The reaction can proceed in the absence of any catalyst but is more advantageously performed in the presence of a catalyst such as a tertiary amine (e.g. triethylamine, tributylamine) or an alkali metal alkoxide (e.g. sodium ethoxide, potassium ethoxide). For increasing the solubility of the S-containing organic phosphorus compound [I] into oils, the hydrocarbon radicals represented by the symbols $R^1$ and $R^2$ in the phosphite compound [III] are preferred to be those having not less than 4 carbon atoms. Further, the carbonyl compound [IV] is favored to be formaldehyde or acetaldehyde which is good in the reactivity or any other compound which can produce either one of them on the reaction (e.g. paraformaldehyde, trioxane, tetraoxane, paraldehyde). Among them, the use of paraformaldehyde is particularly favored, because of its economic availability. Other aldehydes are ketones (e.g. acetone, methylethylketone, methylisobutylketone) may be also used. In general, however, the reactivity of ketones is inferior to that of aldehyde.

The thus prepared phosphonate compound [V] may be subjected to the subsequent reaction in the form of the reaction mixture or after separation from the reaction mixture, for instance, by washing with water or dilute aqueous alkali solution and evaporating water and volatile materials under reduced pressure therefrom.

The reaction of the phosphonate compound [V] with carbon disulfide and an alkali metal hydroxide is usually effected in a molar ratio of 1 : 0.9 – 1.3 : 0.9 – 1.3 at a temperature of 0° to 70°C (preferably of 10° to 50°C) for a period of 30 to 120 minutes. Examples of the alkali metal hydroxide are sodium hydroxide, potassium hydroxide, etc. These may be employed in the form of 5 to 50 % aqueous solution.

As the hydrocarbon group-introducing agent, there may be favorably employed a halogenated hydrocarbon, of which examples are alkyl halide (e.g. methyl chloride, ethyl chloride, propyl chloride, butyl chloride, hexyl chloride, ethyl bromide, propyl bromide, methyl iodide, ethyl iodide), alkenyl halide (e.g. allyl chloride, crotyl chloride, hexenyl chloride, allyl bromide, allyl iodide), aralkyl halide (e.g. benzyl chloride, phenethyl chloride, benzyl bromide, benzyl iodide), etc.

The reaction of the compound [II] with the hydrocarbon group-introducing agent is normally effected in a molar ratio of 1 : 0.8 – 1.2 at a temperature of 0° to 90°C (preferably of 20° to 70°C) for a period of 30 to 80 minutes. The reaction is usually carried out in water. When desired, any water-miscible organic solvent e.g. ethanol, dioxane, tetrahydrofuran, dimethylsulfoxide) may be used together with water.

For the separation of the thus produced compound [I] from the reaction mixture, it may be extracted with water-immiscible organic solvent (e.g. benzene, toluene, hexane), followed by evaporation of volatile materials such as the solvent, the unreacted materials and the like in a conventional distillation procedure, e.g. under reduced pressure at a temperature below 150°C.

The thus obtained S-containing organic phosphorus compound [I] is generally a yellow or orange yellow liquid. It is excellent in resistance to heat, and no change is seen even when heated in water or hydrochloric acid. Further, it shows a good solubility into various oils and is wettable on the surface of various materials such as metals, glasses, plastics and the like. The corrosive property to copper articles is extremely low. Moreover, it can improve markedly the load carrying capacity of lubricating oils. Considering these advantageous properties, the S-containing organic phosphorus compound [I] is useful as an additive to lubricating oils, particularly as an additive in lubricating compositions for improving their wear resistance property and extreme pressure lubricating property. Besides, it is also useful as an insecticide, a herbicide, a plastic stabilizer or the like.

Practical and presently preferred embodiments of this invention are illustratively shown in the following examples.

EXAMPLE 1

Preparation of the S-containing organic phosphorus compound [I: $R^1 = R^2 = C_2H_5$; $R^3 = R^4 = H$; $R^5 = CH_2C_6H_5$]

In a flask equipped with a stirrer, diethyl phosphite (276 g), paraformaldehyde (purity, 92 %; 65 g) and tributylamine (8 g) are charged, and the resulting mixture is heated while stirring. The reaction starts at 85°C, and the temperature reaches to 95°C with generation of heat. The reaction is carried out at the said temperature for 90 minutes. The reaction mixture is filtered to give diethylhydroxymethyl phosphonate (330 g).

In a flask equipped with a stirrer, the above obtained diethylhydroxy phosphonate (330 g) is charged, carbon disulfide (150 g) is added thereto, and the resultant mixture is stirred at 20°C. While keeping the said temperature, 40 % aqueous solution of sodium hydroxide (200 g) is dropwise added thereto. The exothermic reaction proceeds from the starting of the dropwise addition, and the reaction mixture becomes yellow. After about 30 minutes, the dropwise addition is finished, and the reaction is continued at 45°C for 60 minutes.

To the reaction mixture, benzyl chloride (250 g) is added in about 10 minutes, and the reaction is continued at 50°C for 120 minutes. The reaction mixture is extracted with benzene (600 ml), and the extract is washed three times with warm water (500 ml). After evaporation of the solvent from the benzene solution, volatile materials are distilled off at 110°C under about 10 mmHg to give the objective compound (556 g) as a yellow liquid. The elementary analysis of the product is shown in Table 1.

EXAMPLE 2

Preparation of the S-containing organic phosphorus compound [I: $R^1 = R^2 = C_2H_5$; $R^3 = CH_3$; $R^4 = C_2H_5$; $R^5 = CH_2CH=CH_2$]

In a flask equipped with a stirrer, diethyl phosphite (138 g) and sodium ethoxide (0.4 g) are charged, and the resulting mixture is stirred. Then, methylethylketone (72 g) is dropwise added thereto, and the reaction is continued at 50°C for 8 hours. After removal of the unreacted diethyl phosphite and methylethylketone by evaporation distillation under reduced pressure is carried out at 100°C under 1 mmHg to give diethyl-α-hydroxybutyl phosphonate (128 g).

In a flask equipped with a stirrer, the above obtained diethyl-α-hydroxybutyl phosphonate (105 g) is charged, and carbon disulfide (38 g) is added thereto, and the resultant mixture is stirred at 25°C. While keeping the said temperature, 40 % aqueous solution of sodium hydroxide (50 g) is dropwise added thereto. After the dropwise addition is finished, the reaction is continued at 40°C for 60 minutes.

To the reaction mixture, allyl chloride (38 g) is added, and the reaction is carried out at 45°C for 60 minutes. The reaction mixture is extracted with benzene (300 ml). The extract is well washed with warm water. After evaporation of the solvent from the benzene solution, volatile materials are distilled off at 90°C under about 10 mmHg to give the objective compound (131 g) as a yellow liquid. The elementary analysis of the product is shown in Table 1.

EXAMPLE 3

Preparation of the S-containing organic phosphorus compound [I: $R^1 = R^2 = C_4H_9$; $R^3 = R^4 = H$; $R^5 = CH_2C_6H_5$]

As in Example 1, there is produced di-n-butylhydroxymethyl phosphonate (668 g) by the use of di-n-butyl phosphite (582 g), paraformaldehyde (purity, 92 %; 98 g) and tributylamine (17 g). Using the above prepared di-n-butylhydroxymethyl phosphonate (470 g), carbon disulfide (168 g), 30 % aqueous solution of sodium hydroxide (290 g) and benzyl chloride (253 g), the reaction is effected as in Example 1. The reaction mixture is extracted with n-hexane (700 ml), the extract is well washed with warm water and the solvent is removed from the n-hexane solution by evaporation. Then, volatile materials are distilled off at 120°C under 5 mmHg to give the objective compound (640 g) as an orange yellow liquid. The elementary analysis of the product is shown in Table 1.

EXAMPLE 4

Preparation of the S-containing organic phosphorus compound [I: $R^1 = R^2 = C_4H_9$; $R^3 = R^4 = H$; $R^5 = CH_2C_6H_5$]

As in Example 1 but the reaction time being 100 minutes, there is produced diisobutylhydroxymethyl phosphonate (666 g) by the use of diisobutyl phosphite (582 g), trioxane (90 g) and triethylamine (14 g). To a mixture of diisobutylhydroxymethyl phosphonate (448 g) and carbon disulfide (152 g), 40 % aqueous solution of sodium hydroxide (200 g) is dropwise added thereto under the same condition as in Example 1. The reaction is effected at 35°C for 80 minutes. Then, benzyl chloride (253 g) is added thereto, and the reaction is performed at 50°C for 120 minutes. The reaction mixture is extracted with n-hexane, the extract is washed with water and the solvent is evaporated from the n-hexane solution. Removal of volatile materials by evaporation at 120°C under 10 mmHg affords the objective compound (647 g) as an orange yellow liquid. The elementary analysis of the product is shown in Table 1.

EXAMPLE 5

Preparation of the S-containing organic phosphorus compound [I: $R^1 = R^2$ $C_4H_9$; $R^3 = R^4 = H$; $R^5 = CH_2CH=CH_2$]

Diisobutylhydroxymethyl phosphonate (448 g) as obtained in Example 4 is admixed with carbon disulfide (152 g), and 25 % aqueous solution of sodium hydroxide (320 g) is dropwise added thereto while cooling at 20°C. The reaction is carried out at 50°C for 60 minutes. Further, allyl chloride (153 g) is added thereto, and the reaction is continued at 50°C for 120 minutes. The reaction mixture is extracted with n-hexane (600 ml) and washed with warm water. By evaporation of volatile materials at 100°C under 10 mmHg, there is obtained the objective compound (544 g) as a yellow liquid. The elementary analysis of the product is shown in Table 1.

EXAMPLE 6

Preparation of the S-containing organic phosphorus compound [I: $R^1 = R^2 = R^5 = C_4H_9$; $R^3 = R^4 = H$]

Diisobutylhydroxymethyl phosphonate (448 g) as obtained in Example 4 is admixed with carbon disulfide (152 g), and 30 % aqueous solution of potassium hydroxide (280 g) is dropwise added thereto while cooling at 20°C. The reaction is carried out at 50°C for 60 minutes. Then, sec.-butyl bromide (274 g) is added thereto, and the reaction is carried out at 60°C for 150 minutes. The reaction mixture is extracted with n-hexane (700 ml), washed with warm water and treated as in Example 3 to give the objective compound (570 g) as an orange yellow liquid. The elementary analysis of the product is shown in Table 1.

EXAMPLE 7

Preparation of the S-containing organic phosphorus compound [I: $R^1 = R^2 = CH(CH_3)CH_2CH(CH_3)_2$; $R^3 = R^4 = H$; $R^5 = C_4H_9$]

As in Example 1, there is produced di(1-isobutylethyl)-hydroxymethyl phosphonate having an acid value of 9.3 (2499 g) by the use of di(1-isobutylethyl) phosphite (2250 g), paraformaldehyde (purity, 88 %; 307 g) and tributylamine (50 g).

In a flask equipped with a stirrer, di(1-isobutylethyl)-hydroxymethyl phosphonate (588 g) is charged, carbon disulfide (152 g) is added thereto, and the resultant mixture is stirred at 20°C. After the dropwise addition of 40 % aqueous solution of sodium hydroxide (210 g), the reaction is carried out at 50°C for 60 minutes.

To the reaction mixture, t-butyl chloride (185 g) is added, and the reaction is carried out at 50°C for 120 minutes. The reaction mixture is extracted with n-hexane (600 ml), the extract is washed with warm water and the solvent is removed from the n-hexane solution by evaporation. Then, volatile materials are distilled off at 100°C under 5 mmHg to give the objective compound as an orange yellow liquid (649 g). The elementary analysis of the product is shown in Table 1.

EXAMPLE 8

Preparation of the S-containing organic phosphorus compound [I: $R^1 = R^2 = CH(CH_3)CH_2CH(CH_3)_2$; $R^3 = R^4 = H$; $R^5 = CH_2C_6H_5$]

Di(1-isobutylethyl)hydroxymethyl phosphonate having an acid value of 9.3 (800 g) as obtained in Example 7 is washed with 0.5 % aqueous solution of sodium hydroxide (1000 ml) and further three times with hot water (1200 ml). Removal of volatile materials at 100°C under 5 mmHg affords di(1-isobutylethyl)hydroxymethyl phosphonate having an acid value of 0.4 (744 g). To the thus obtained di(1-isobutylethyl)hydroxymethyl phosphonate (560 g), carbon disulfide (167 g) is added, and 40 % aqueous solution of sodium hydroxide (200 g) is dropwise added thereto at 20°C while stirring. The reaction is carried out at 50°C for 60 minutes. After the addition of benzyl chloride (253 g), the reaction is continued at 50°C for 120 minutes. The reaction mixture is extracted with n-hexane (800 ml), the extract is washed with warm water and the solvent is evaporated from the n-hexane solution. Removal of volatile materials by distillation at 110°C under about 5 mmHg affords the objective compound (747 g) as an orange yellow liquid. The elementary analysis of the product is shown in Table 1.

EXAMPLE 9

Preparation of the S-containing organic phosphorus compound [I: $R^1 = R^2 = CH(CH_3)CH_2CH(CH_3)_2$; $R^3 = R^4 = H$; $R^5 = CH_2CH=CH_2$]

Di(1-isobutylethyl)hydroxymethyl phosphonate having an acid value of 9.3 (1500 g) as obtained in Example 7 is washed five times with water (2000 ml), and volatile materials are evaporated at 100°C under 5 mmHg to give di(1-isobutylethyl)-hydroxymethyl phosphonate having an acid value of 1.1 (1383 g). To the thus obtained di(1-butyléthyl)hydroxymethyl phosphonate (560 g), carbon disulfide (160 g) is added, and 40 % aqueous solution of sodium hydroxide (200 g) is dropwise added thereto at 20°C while stirring. The reaction is carried out at 50°C for 60 minutes. After the addition of allyl chloride (153 g), the reaction is continued at 50°C for 120 minutes. The reaction mixture is extracted with n-hexane (700 ml), the extract is washed with warm water and the solvent is evaporated from the n-hexane solution. Removal of volatile materials by distillation at 110°C under 10 mmHg affords the objective compound (656 g) as an orange yellow liquid. The elementary analysis of the product is shown in Table 1.

EXAMPLE 10

Preparation of the S-containing organic phosphrus compound [I: $R^1 = R^2 = CH(CH_3)CH_2CH(CH_3)_2$; $R^3 = R^4 = H$; $R^5 = CH_2CH=CHCH_3$]

In a flask equipped with a stirrer, di(1-isobutylethyl)hydroxymethyl phosphonate having an acid value of 9.3 (560 g) as obtained in Example 7 is charged, carbon disulfide (182 g) is added thereto, and the resultant mixture is stirred at 20°C. To the resulting mixture, 40 % aqueous solution of sodium hydroxide (220 g) is dropwise added, and the reaction is carried out at 50°C for 60 minutes. Crotyl chloride (182 g) is added to the resultant mixture, and the reaction is further continued at 60°C for 180 minutes. The reaction mixture is extracted with n-hexane (700 ml), the extract is washed with warm water and the solvent is evaporated from the n-hexane solution. By distilling off volatile materials at 110°C under about 5 mmHg, there is produced the objective compound (633 g) as an orange yellow liquid. The elementary analysis of the product is shown in Table 1.

EXAMPLE 11

Preparation of the S-containing organic phosphorus compound [I: $R^1 = R^2 = CH_2CH(C_2H_5)(CH_2)_3CH_3$; $R^3 = R^4 = H$; $R^5 = C_4H_9$]

In a flask equipped with a stirrer, di(2-ethylhexyl)-phosphite (918 g) and paraformaldehyde (purity, 92 %; 98 g) are charged, and the resultant mixture is stirred at 110° to 120°C for 2 hours. The reaction mixture is filtered to give di(2-ethylhexyl)hydroxymethyl phosphonate (993 g).

In a flask equipped with a stirrer, di(2-ethylhexyl)-hydroxymethyl phosphonate (672 g) is charged, carbon disulfide (152 g) is added thereto, and the resultant mixture is stirred at 20°C. While keeping this temperature, 40 % aqueous solution of sodium hydroxide (200 g) is dropwise added thereto, and the reaction is further continued at 50°C for 60 minutes.

To the reaction mixture, t-butyl chloride (185 g) is added, and the reaction is carried out at 50°C for 120 minutes. The reaction mixture is extracted with n-hexane (900 ml), the extract is washed with warm water and the solvent is evaporated. By distilling off volatile materials at 110°C under about 5 mmHg, there is produced the objective compound (776 g) as an orange yellow liquid. The elementary analysis of the product is shown in Table 1.

EXAMPLE 12

Preparation of the S-containing organic phosphorus compound [I: $R^1 = R^2 = CH_2CH(C_2H_5)(CH_2)_3CH_3$; $R^3 = R^4 = H$; $R^5 = CH_2C_6H_5$]

To di(2-ethylhexyl)hydroxymethyl phosphonate (672 g) obtained as in Example 11, 40 % aqueous solution of sodium hydroxide (200 g) is dropwise added while stirring at 20°C, and then carbon disulfide is portionwise added thereto. The reaction is carried out at 50°C for 60 minutes. Then, benzyl chloride (253 g) is added thereto, and the reaction is further continued at 50°C for 120 minutes. The reaction mixture is extracted with n-hexane (900 ml), the extract is washed with warm water and the solvent is evaporated. By distilling off volatile materials at 120°C under 5 mmHg, there is produced the objective compound (853 g) as an orange yellow liquid. The elementary analysis of the product is shown in Table 1.

EXAMPLE 13

Preparation of the S-containing organic phosphorus compound [I: $R^1 = R^2 = CH_2CH(C_2H_5)(CH_2)_3CH_3$; $R^3 = R^4 = H$; $R^5 = CH_2CH=CH_2$]

To a mixture of di(2-ethylhexyl)hydroxymethyl phosphonate (672 g) as obtained in Example 11 and carbon disulfide (152 g), 40 % aqueous solution of sodium hydroxide (200 g) is dropwise added at 20°C while stirring, and the reaction is carried out at 50°C for 60 minutes. Then, allyl chloride (153 g) is added thereto, and the reaction is further continued at 50°C for 120 minutes. The reaction mixture is extracted with n-hexane (900 ml), the extract is washed with warm water and the solvent is evaporated from the n-hexane solution. By distilling off volatile materials at 110°C under 10 mmHg, there is produced the objective compound (742 g) as an orange yellow liquid. The elementary analysis of the product is shown in Table 1.

EXAMPLE 14

Preparation of the S-containing organic phosphorus compound [I: $R^1 = R^2 = CH_2CH(C_2H_5)(CH_2)_3CH_3$; $R^3 = H$; $R^4 = CH=CHCH_3$; $R^5 = CH_2C_6H_5$]

As in Example 1, there is produced di(2-ethylhexyl-α-hydroxycrotyl phosphonate (982 g) by the use of di(2-ethylhexyl) phosphite (918 g), crotonaldehyde (210 g) and tributylamine (17 g). The thus produced di(2-ethylhexyl)-α-hydroxycrotyl phosphonate (752 g) is charged in a flask equipped with a stirrer, carbon disulfide is added thereto, and stirring is carried out at 20°C. After the dropwise addition of 40 % aqueous solution of sodium hydroxide (200 g), the reaction is effected at 50°C for 60 minutes. Then, benzyl chloride (253 g) is added to the reaction mixture, and the reaction is continued at 50°C for 120 minutes. The reaction mixture is extracted with n-hexane (1000 ml), the extract is washed with warm water and the solvent is evaporated from the n-hexane solution. By distilling off volatile materials at 110°C under about 5 mmHg, there is produced the objective compound (870 g) as an orange yellow liquid. The elementary analysis of the product is shown in Table 1.

Table 1

| Elementary analysis Example | P (%) Found | P (%) Calcd. | S (%) Found | S (%) Calcd. |
|---|---|---|---|---|
| 1 | 9.4 | 9.28 | 19.0 | 19.2 |
| 2 | 9.6 | 9.5 | 19.4 | 19.6 |
| 3 | 7.9 | 7.9 | 16.1 | 16.4 |
| 4 | 8.0 | 7.9 | 16.0 | 16.4 |
| 5 | 9.1 | 9.0 | 18.6 | 18.8 |
| 6 | 8.6 | 8.7 | 17.7 | 18.0 |
| 7 | 7.3 | 7.5 | 15.1 | 15.5 |
| 8 | 7.0 | 6.9 | 14.1 | 14.3 |
| 9 | 7.8 | 7.8 | 15.8 | 16.1 |
| 10 | 7.4 | 7.5 | 15.3 | 15.6 |
| 11 | 6.5 | 6.6 | 13.4 | 13.7 |
| 12 | 6.2 | 6.2 | 12.6 | 12.7 |
| 13 | 6.8 | 6.8 | 14.0 | 14.2 |
| 14 | 5.6 | 5.7 | 11.5 | 11.8 |

The S-containing organic phosphorus compounds [I] prepared in the above Examples are quite stable to chemicals. For instance, the S-containing organic phosphorus compound [I: $R^1 = R^2 = CH(CH_3)CH_2CH(CH_3)_2$; $R^3 = R^4 = H$; $R^5 = CH_2C_6H_5$] as obtained in Example 8 does not show any decomposition even when boiled in water or aqueous hydrochloric acid.

Further, they are relatively stable to heat. For instance, the differential thermal analysis of some S-containing organic phosphorus compounds [I] as obtained in the said Examples affords the results as shown in Table 2.

Table 2

| Example | Initiation of thermal degradation (°C) | Appearance of differential heat (°C) |
|---|---|---|
| 3 | 200 | 215 |
| 5 | 205 | 215 |
| 7 | 200 | 230 |
| 8 | 210 | 225 |
| 9 | 210 | 235 |
| 11 | 220 | 265 |
| 12 | 225 | 260 |
| 13 | 235 | 260 |

The S-containing organic phosphorus compounds [I] show only a slight toxicity to mammals and are quite safe to human beings and animals. For instance, the acute oral toxicities of the compounds in the foregoing Examples 8 and 12 determined in the test using mice are respectively $LD_{50}>10,000$ μl/kg and $LD_{50}>6,480$ μl/kg.

The S-containing organic phosphorus compounds [I] of the invention are particularly useful as additives to lubricating oils, such as hydraulic fluids, automatic transmission fluids, internal combustion engine oils and gear oils, which require wear-resistant or extreme pressure lubricating properties.

Referring to the hydraulic fluids, in operating hydraulic pumps (particularly vane pumps), the rise of the working pressure and the high speed rotation have given rise to a greater wear between the cam ring and the vane. To provide against this wear, there have been used zinc dialkyldithiophosphates or other sulfur-phosphorus extreme pressure additives. Still, however, they are not entirely satisfactory to ensure a long lasting performance under severe operating conditions, nor have fully settled the problems concerning to discoloration and corrosion of copper alloy bushing.

By the co-use of suitable anti-oxidants, corrosion inhibitors, rust preventives and the like with the S-containing organic phosphorus compounds [I] of the invention, it is not only possible to prevent more effectively the wear of machinery parts under stern conditions than with conventional lubricating additives but also to improve durability and non-corrosion quality of these parts more than expected.

With regard to internal combustion engine oils, extreme pressure lubricants having nearly satisfactory performance are obtainable by using zinc dialkyldithiophosphates or zinc diaryldithiophosphates coupled with various kinds of detergent-dispersants. In recent years, however, there has been a new demand for lubricants having lower ash contents, and as there has been a strong requirement of public for saving of resources, it is expected that lubricants should have a longer durability.

The S-containing organic phosphorus compounds [I] of the invention display, by the combination with ashless dispersants, anti-oxidants, detergents, etc., a function of extreme pressure lubrication equivalent to conventional internal combustion engine oils which contain zinc dialkyldithiophosphates with a stability to high temperature close to internal combustion engine oils which contain zinc diaryldithiophosphates. Moreover, it is possible to obtain internal combustion engine oils which has a lesser ash content.

In gear oils, the lubrication of gearwheel requires to cover the characteristic factor of the gearwheel which shows especially a high contact load on the friction surfaces where the film of the lubricating oils is apt to break to cause a wear of gear surface or its damage by seizure. Particularly, in the hypoid gears used for the reduction gears in a majority of motor cars and the gearwheels for driving the rolls of rolling mills, table rollers, etc. which sustain a shocking load, the extreme pressure lubricating oils are essentially used for prevention of damage. To meet these requirements, various kinds of extreme pressure lubricating compositions have been used since around 1925. However, the recent progress of gear engineering promotes to use smaller gear with high performance, and the gears have increasingly been used under high speed and high horse power conditions. Thus, the rise of the oil temperature has become unavoidable. In the case of motor cars, because of the attachements of catalytic converter mufflers, after-burner mufflers, etc. for emission control, an additional rise of the gear lubricating oil temperature may be at present in excess of 120°C, which is a conventionally accepted temperature limit for the working temperature.

Illustrating the working mechanism of an extreme pressure lubricating oil, it is reacted with a metal at a hot spot of mutually contacting frictional surfaces to produce metal sulfide, chloride, phosphate or the like and to prevent wear or seizure by fusion of the microscopic convex portions of the frictional surface by the action of the film produced. Accordingly, an extreme pressure lubricating oil must react well with steel or its alloy to form a useful inorganic film.

The film should desirably have the properties to adhere to the frictional surface uniformly, thinly and firmly, and also to alleviate the shearing stress in the same way as the solid lubricant. The reaction of the lubricant to the metal surface should not be exerted corrosively.

There are known a variety of chemical substances having such extreme pressure lubricating action. For the practical use, however, they should have also some other properties such as corrosion resistance to non-ferrous alloys and rust prevention to steel alloys. Further, they are required to be hardly oxidized or heat decomposed and to be capable of using for several thousand hours or, in case of motor cars, for 100,000 – 200,000 kilometers.

Most of conventional extreme pressure lubricant compositions are such as has an insufficient stability to a higher oil temperature even if it has a sufficient performance for extreme pressure lubrication, or, has an unsatisfactory performance of extreme pressure lubrication even if it has a sufficient stability to a higher oil temperature. Most of hypoid gear oils that may be satisfactory in both functions have the limiting oil temperature of nearly 125°C durable for the use for 500 – 1,000 hours or 50,000 – 100,000 kilometers. Generally, the usable life of lubricants is reduced to half by their temperature rise of about 8° – 10°C. Accordingly, there are rare extreme pressure gear oils that have a sufficient durability for the uses in which the oil temperature exceeds 135°C.

By using an extreme pressure lubricating oil composition comprising the S-containing organic phosphorus compounds [1], it is possible to use machineries with all the above-described functions satisfied and with a longer durable life even under the condition of a maximum oil temperature of 170°C and an average oil temperature of 135°C.

The concentration of the S-containing organic phosphorus compound [1] of the invention in lubricating oil compositions depends primarily upon the type of oil used and the nature of the service to which the lubricating oil compositions are subjected. In most instances, the concentration will range from about 0.1 to about 10.0 percent by weight of the lubricating oil composition. More particularly, for example, a lubricating oil composition for hypoid gears may have a concentration of more than 1 percent by weight.

The extreme pressure lubricating properties of some of the S-containing organic phosphorus compounds [1] as well as those of some conventional extreme pressure additive are shown in Table 3.

Table 3

| Test sample[1] | | JIS 4 ball test[2] IS load (kg) | Shell 4 ball test[3] | | Copper corrosion test[4] 121°C, 3 hrs | Thermal stability test[5] 121°C (hrs) |
|---|---|---|---|---|---|---|
| Additive | Amount (% by weight) | | IS load (kg) | Welding load (kg) | | |
| Product in Example 9 | 1.0 | 192 | 126 | 178 | 1b | >168 |
|  | 2.5 | 242 | 158 | 224 | 1b | 168 |
| Product in Example 8 | 0.7 | 242 | 141 | 200 | (Edwin ->168 | |
|  | 3.0 | 293 | 158 | 316 | 1b | Standard 168 |
| Product in Example 13 | 1.0 | 217 | 126 | 200 | and 168 | |
|  | 3.0 | 267 | 158 | 282 | 2a | 144 |
| Product in Example 12 | 1.5 | 141 | 224 | 1a | >168 | |
|  | 2.5 | 267 | 158 | 251 | 1b | >168 |
| Product in Example 3 | 0.5 | 197 | 126 | 158 | 1a | 144 |
|  | 2.0 | 242 | 141 | 224 | 1b | 144 |
| Zinc di-hexyldithio-phosphate | 0.7 | 167 | 112 | 282 | 1a | >168 |
|  | 2.0 | 217 | 126 | 355 | 1b | >168 |
| Gear oil A | 6.5 | 242 | 141 | 355 | 2a | 168 |
| Gear oil B | 7.0 | 217 | 126 | 316 | 1b | >168 |
| Gear oil C | 9.5 | 267 | 141 | 398 | 2c | 120 |
| Gear oil D | 6.3 | 242 | 158 | 355 | 2a | 144 |

Note:
[1]The test sample was prepared by adding the additive to a solvent refined base oil SAE 90. The additive in gear oil A is "Anglamol 99" (Lubrizol Corp.). The additive in gear oil B is "Anglamol 98A" (Lubrizol Corp.). The additive in gear oil C is "Santopoid 23 RI" (Monsanto Chemical Co.). The additive in gear oil D is "Hitec 333" (Edwin Cooper & Co., Ltd.).
[2]JIS (Japanese Industrial Standard) K2519-67.
[3]ASTM (American Society for Testing and Materials) D2783-71.
[4]ASTM D130-68.
[5]Air oven test (the time until haze or precipitation is produced).

From the above results, it may be understood that the additives of the invention are more excellent than conventional extreme pressure additives not only in extreme pressure lubricating property but also in anti-corrosion to copper and thermal stability.

The most characteristic feature of the lubricating oil composition according to the present invention is the inclusion of the S-containing organic phosphorus compound [1]. It is particularly effective to use the said compound together with a hydrocarbon polysulfide or its reaction product with a tertiary phosphite for hypoid gears. Lubricants containing such combination of additives are characterized by non-corrosiveness, improved stability against oxidative and thermal degradation, and the ability to provide effective lubrication under such conditions as being exposed to shock load, high speed and high torque.

The substantially hydrocarbon polysulfides which are especially useful for this purpose include principally aliphatic, cycloaliphatic and aromatic disulfides, trisulfides, tetrasulfides, pentasulfides or higher polysulfides. The term "polysulfide" as used herein designates compounds in which two substantially hydrocarbon radicals are joined to a group consisting of at least 2 sulfur atoms. Such polysulfides are represented, for the most part, by any of the structural formulas below.

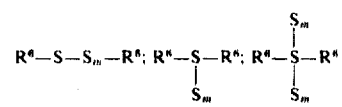

wherein $R^a$ is a substantially hydrocarbon radical and $m$ is an integer preferably less than 6. The nature of the linkage between the sulfur atoms is not clearly understood, although it is believed that such linkage may be described by a single covalent bond, a double bond or a coordinate covalent bond.

Polysulfides preferred for use herein are alkyl polysulfides, cycloalkyl polysulfides, aralkyl polysulfides, aryl polysulfides, alkaryl polysulfides or polysulfides having a mixture of such hydrocarbon radicals. The polysulfides containing at least about 6 carbon atoms per molecule have greater oil solubility and are generally preferred. Specific examples of such polysulfides are diisobutyl trisulfide, diisopentyl trisulfide, di-n-butyl tetrasulfide, dicyclopentyl disulfide, dimethylcyclohexyl tetrasulfide, di-2-ethylcyclopentyl disulfide, dipentyl trisulfide, β-pinylpentasulfide, dibenzyl trisulfide, benzyl isooctyl disulfide, diphenyl disulfide, cyclohexyl cyclopentyl trisulfide, α-butyl-β-naphthyl trisulfide, bis(polyisobutene (molecular weight of 1000)-substituted-phenyl)-disulfide, ditolyl disulfide, diparaffin wax trisulfide diterpenyl disulfide, bis(o,p-diisopropylphenyl)tetrasulfide, didodecyl trisulfide, dibehenyl trisulfide and isobutyl cyclohexyl tetrasulfide. other polysulfides such as polar substituted polysulfides are exemplified by di(p-chlorobenzyl)disulfide, di(ω-bromopentyl)trisulfide, di(p-butoxyphenyl)disulfide and di(o-nitro-p-heptylphenyl)disulfide.

Since the polysulfides have generally a tendency to corrode copper and its alloys, such unfavorable property may be eliminated by treatment of them with tertiary phosphites on heating. Such treatment may be also effective in increasing the extreme pressure lubrication property. In the treatment, for instance, a polysulfide (100 parts by weight) and a tertiary phosphite (5 to 50 parts) may be mixed together at a temperature of 50° to 150°C, preferably under a reduced pressure or in an inert gas, for a period of 0.5 to 3 hours. As the tertiary phosphite, there may be used the one represented by the formula:

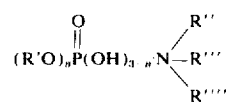

wherein R', R'' and R''' are each an aliphatic or aromatic hydrocarbon group having 2 to 18 carbon atoms, preferably alkyl or alkenyl having 8 to 18 carbon atoms.

The amount of the hydrocarbon polysulfide or its reaction product with the tertiary phosphite to be incorporated may be usually about 0.5 to about 10 percent by weight based on the weight of the lubricating oil.

In place of or in addition to the hydrocarbon polysulfide or its reaction product with the tertiary phosphite, there may be also employed for attaining the substantially same purpose the reaction product of an acid phosphate and an amine, which is representable by the formula:

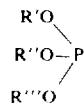

wherein $n$ is an integer of 1 or 2, R' is an aliphatic hydrocarbon group such as alkyl or alkenyl having 6 to 18 carbon atoms and R'', R''' and R'''' are each a hydrogen atom or an aliphatic or aromatic hydrocarbon group, provided that at least one of R'', R''' and R'''' is not a hydrogen atom.

For the same purpose as above, the said acid phosphate itself may be used. Also, aliphatic secondary phosphites of the formula:

wherein R' is an aliphatic hydrocarbon group such as alkyl or alkenyl having 10 to 18 carbon atoms may be used.

The results of the tests for the extreme pressure lubricating property and the non-corrosion property to copper of some lubricating oil compositions comprising the S-containing organic phosphorus compounds [I] and the additives as above are shown in Table 4.

Table 4

| Lubricating oil composition[1] Additive (% by weight) | a | b | c | d | e | f | g | h | i | j | k | l |
|---|---|---|---|---|---|---|---|---|---|---|---|---|
| Sulfurized olefin "Anglamol 32" (Lubrizol Corp.) | 3.0 | 3.0 | 2.0 | 1.0 | 1.0 | — | — | 2.0 | 1.0 | 1.0 | — | — |
| Sulfurized terpene "Amoco 48" (Amono Chem.) | — | — | — | — | — | 2.0 | 1.0 | — | — | — | — | — |
| Sulfurized fatty oil "Lubrizol 5006" (Lubrizol Corp.) | — | — | — | — | 2.0 | — | — | — | 2.0 | 2.0 | — | — |
| Dibenzyldisulfide | — | — | — | — | — | 0.5 | 0.5 | — | — | — | — | 0.3 |
| 2-Ethylhexyl acid phosphate oleylamine salt | — | — | — | — | — | — | — | — | — | — | 0.5 | 0.5 |
| Trilauryl phosphite | — | 0.6 | 0.4 | 0.3 | 0.35 | — | 0.3 | — | 0.2 | 0.3 | — | — |
| Product in Example 9 | — | — | — | — | — | — | — | 1.5 | — | — | — | — |
| Product in Example 8 | — | — | 1.5 | — | — | — | — | — | — | 1.0 | 1.5 | — |
| Product in Example 13 | — | — | — | — | 1.5 | — | — | — | — | — | — | — |
| Product in Example 12 | — | — | — | 1.0 | — | — | 1.5 | — | — | — | — | 1.5 |
| JIS 4 ball test[2] IS load (kg) | 167 | 217 | 267 | 267 | 293 | 158 | 267 | 167 | 192 | 242 | 242 | 267 |
| Copper corrosion test[3] 121°C, 3 hrs | 2a | 1b | 1b | 1b | 1b | 2a | 1b | 1a | 2a | 2a | 1a | 1b |

Note
[1] The composition was prepared by adding the additive(s) to a solvent refined base oil SAE 90. In case of the compositions b, c, d, e, i and j, the sulfurized olefin and trilauryl phosphite were first admixed while heating and then added to the oil.
[2] JIS K2519-67
[3] ASTM D130-68 wherein R', R'' and R''' are each an aliphatic or aromatic hydrocarbon group having 2 to 18 carbon atoms, From the above results, it may be understood that the combined use of the S-containing organic phosphorus compounds [I] and the additives are shown in the table produces a synergistic effect in the extreme pressure lubricating property and the non-corrosion property to copper.

The lubricating oil composition of this invention may further contain a dispersant, of which effective examples are N-substituted alkenylsuccinimide derivatives (particularly the ones reacted with boron compounds or alkylene oxide), polybutenylsuccinic acid pentaerythritol ester, polybutenylalkylamine, polybutenylhydroxybenzylamine, etc. By the use of such dispersant, sludging or lacquer formation of any component effective for extreme pressure lubrication from the lubricating oil composition at elevated temperatures can be prevented. Many conventional dispersants result in the depression of the extreme pressure lubrication property when incorporated, but the said dispersant does not afford any material influence on such property and rather improves remarkably the durability to high temperature of the lubricating oil composition. The concentration of the dispersant may be usually from about 5 to about 20 percent by weight based on the combined weight of the S-containing organic phosphorus compound [I] and the hydrocarbon polysulfide or its derivative.

When the S-containing organic phosphorus compound [I] is used as an additive to a lubricating oil for internal combustion engines, it is preferred to incorporate therein, in addition to ashless dispersants, metallic detergents such as neutral or overbasic alkaline earth metal salt of alkylbenzene-sulfonic acid, petroleum sulfonic acid and alkylnaphthalene-sulfonic acid, neutral or overbasic alkaline earth metal phenate of alkylphenol and sulfurized alkylphenol, neutral or overbasic alkaline earth metal carboxylate of alkylsalicylic acid, neutral or overbasic alkaline earth metal salt of polybutenylthiophosphonate and the like (the alkeline earth metal being usually calcium, barium or magnesium), whereby the corrosive wear due to the acidic material in blow by gas is prevented and the detergency and the dispersancy at high temperatures are increased.

The lubricating oil composition of the invention may further contain other additives such as corrosion inhibitors, rust inhibitors, oxidation inhibitors, etc.

Examples of the corrosion inhibitors, particularly effective for copper and its alloys at a temperature higher than 120°C, are those having a C—N—N bond such as benzotriazole and indazole and those having a N=C—S—S bond such as 2-(n-alkyldithio)benzothiazole, 2,5-bis(n-alkyldithio)-1,3,4-thiadiazole, 2,5-bis(N,N-dialkyldithiocarbamyl)-1,3,4-thiadiazole, 2-(n-alkyldithio)benzoxazole and 2-(n-alkyldithio)benzimidazole. The corrosion inhibitors are effective not only for preventing the corrosion of copper and its alloys but also for suppressing the promotion of the oxidative deterioration of oils due to the copper dissolved therein.

The results as shown in Table 5 indicate the extreme pressure lubricating property and the oxidation stability of some lubricating oil compositions comprising extreme pressure additives, ashless dispersants and corrosion inhibitors.

Table 5

| Lubricating oil composition 1) Additive (% by weight) | m | n | o | p | q | r | s | Gear oil A |
|---|---|---|---|---|---|---|---|---|
| Sulfurized olefin 2) | 3.0 | — | 2.0 | 2.0 | 2.0 | — | — | |
| Product in Example 8 | — | 3.0 | 1.5 | — | — | 2.5 | — | |
| Product in Example 12 | — | — | — | 1.5 | 1.5 | — | 2.0 | |
| 2-Ethylhexyl acid phosphate coconut amine salt | — | — | — | — | — | 0.5 | 1.0 | |
| Polybutenyl succinimide-borate "Lubrizol 935" (Lubrizol Corp.) | — | 0.3 | — | 0.6 | 0.3 | 0.8 | 0.4 | |
| Polybutenyl succinate "Lubrizol 936" (Lubrizol) | — | — | 0.2 | — | — | — | — | |
| Benzotriazole | — | 0.03 | — | 0.03 | 0.03 | — | — | |
| JIS 4 ball test 3) IS load (kg) | 192 | 267 | 267 | 242 | 267 | 217 | 267 | 242 |
| Indiana stirring oxidation test 4) 135°C, 96 hrs | | | | | | | | |
| Viscosity increase (%) | 14 | 9.8 | 12 | 7.8 | 8.2 | 4.9 | 6.0 | 9.4 |

Table 5-continued

| Additive (% by weight) Lubricating oil composition 1) | m | n | o | p | q | r | s | Gear oil A |
|---|---|---|---|---|---|---|---|---|
| n-Pentane insoluble (%) | 0.6 | 0.2 | 0.4 | 0.05> | 0.05> | 0.05> | 0.1 | 0.38 |
| Lacquer formation | heavy | none | light | none | none | none | none | heavy |

Note:
1) The composition was prepared by adding the additive(s) to a solvent refined base oil SAE 90. The gear oil A as control is the same as in Table 3.
2) The sulfurized olefin (2.6 or 1.8 parts by weight) was reacted with triisodecyl phosphite (0.4 or 0.2 part by weight) at 120°C for 30 minutes and then incorporated into the oil.
3) JIS K2519-67.
4) JIS K2514-72.

Examples of the rust inhibitors, especially effective for inhibition of the rusting on a steel surface at high humidity conditions without any depression of the extreme pressure lubrication and high temperature stability, are alkyl acid phosphates and their alkylamine salts, alkyl or alkenyl succinic acids and their derivatives, sorbitol fatty acid esters, reaction products of dialkylphosphoric acids with ethylene oxide, etc.

Examples of the oxidation inhibitors, especially effective for increasing the high temperature stability, are hindered bisphenols (e.g. 4,4'-methylene-bis (2,6-di-t-butylphenol), 4,4'-bis(2,6-di-t-butylphenol), 4,4'-thio-bis(6-t-butyl-o-cresol), 2,6-di-t-butyl-α-dimethylamino-p-cresol), aromatic amines (e.g. α-naphthylamine, di-sec.-butyldiphenylamine, p,p'-dioctyldiphenylamine, bis(p-dimethylaminophenyl)-methane), zinc dialkyldithiophosphates, dialkyldithiocarbamates (e.g. zinc, cadmium, ammonium, alkyl dialkyldithiocarbamates), etc.

Moreover, any other commercially available additives useful as pour point depressants, antifoaming agents, viscosity index improvers and the like may be incorporated into the lubricating oil composition of the invention.

The lubricating oils in which the S-containing organic phosphorus compound [I] is useful as an additive may be of synthetic, animal, vegetable, or mineral origin. Ordinarily, mineral lubricating oils are preferred by reason of their availability, general excellence, and low cost. For certain applications, oils belonging to one of the other free groups may be preferred. For instance, synthetic polyester oils such as didodecyl adipate and di-2-ethylhexyl sebacate are often preferred as jet engine lubricants. Normally, the lubricating oils will be 3.0 to 40 cSt in viscosity at 98.89°C, more than about 80 in viscosity index, higher than about 180°C in flash point and about 250° to 600°C in boiling point.

Lubricating oils of mineral origin may be the ones of paraffin, naphthene or mixed type, preferably purified, for instance, by treating with an appropriate solvent such as phenol, propane or furfural to eliminate asphalten and aromatics, treating with activated clay or aluminum chloride to decrease impurities and/or subjecting to hydrogenation or hydrogenolysis to reduce unstable components. Further, those are favorably subjected to dewaxing in order to improve the fluidity at low temperature.

Lubricating oils of synthetic origin may be, for instance, polymerized oils of α-olefins, polyisobutylene, synthetic hindered esters (e.g. dipentaerythritol ester, trimethylolpropane ester), polyethers (e.g. polypropylene glycol), etc. These are preferred to have a stability at higher temperature.

Practical and presently preferred examples of the lubricating oil composition according to the present invention are shown below. Parts are by weight.

EXAMPLE A

The S-containing organic phosphorus compound [I: $R^1 = R^2 = CH(CH_3)CH_2CH(CH_3)_2$; $R^3 = R^4 = H$; $R^5 = CH_2C_6H_5$] (3.0 parts) is incorporated into a mineral oil SAE 90 (viscosity index, 95) (97.0 parts) to give a gear lubricating oil composition.

EXAMPLE B

The S-containing organic phosphorus compound [I: $R^1 = R^2 = CH_2(CH_2)_2CH_3$; $R^3 = R^4 = H$; $R^5 = CH_2C_6H_5$] (1.5 parts, α-olefin polysulfides containing $C_8H_{14}S_3$ as a major component (2.0 parts) and triisodecyl phosphite (0.4 part), zinc diamyldithiocarbamate (0.3 part), decyl acid phosphate (0.2 part), polybutenylsuccinimide-boron compound "Lubrizol 935" (Lubrizol Corp.) (0.35 part) and polymerized alkylsiloxane "DC-A" (Dow Corning Corp.) (0.003 part) are incorporated into a mineral oil SAE 90 to make a total weight of 100 parts, whereby a gear lubricating oil composition is obtained.

EXAMPLE C

The S-containing organic phosphorus compound [I: $R^1 = R^2 = CH_2CH(C_2H_5)(CH_2)_3CH_3$; $R^3 = R^4 = H$; $R^5 = CH_2C_6H_5$] (3.0 parts), polybutenyl hydroxybenzylamine "Amoco 9250" (Amoco Chem.) (0.6 part), 2,5-bis(t-octyldithio)-1,3,4-thiadiazole (0.2 part), sorbitan monooleate (0.3 part) and polymerized methacrylate "Plexol 150" (Rohm & Haas Co.) (0.1 part) are incorporated into a mineral oil SAE 80 to make a total weight of 100 parts, whereby a gear lubricating oil composition is obtained.

EXAMPLE D

The S-containing organic phosphorus compound [I: $R^1 = R^2 = CH_2CH(C_2H_5)(CH_2)_3CH_3$; $R^3 = R^4 = H$; $R^5 = CH_2C_6H_5$] (1.0 part), polybutenyl succinimide "Lubrizol 890" (Lubrizol Corp.) (3.0 parts), overbasic barium nonylnaphthalenesulfonate "NA-Sub-BSB" (R.T. Vanderbilt Co., Inc.) (1.0 part), dodecenylsuccinic anhydride (0.1 part), polymerized methacrylate "Plexol 732" (Rohm & Haas Co.) (7.5 parts) and polymerized alkylsiloxane DC-A (Dow Corning Corp.)

EXAMPLE E

The S-containing organic phosphorus compound [I: $R^1 = R^2 = CH_2CH(C_2H_5)(CH_2)_3CH_3$; $R^3 = R^4 = H$; $R^5 = CH_2CH=CH_2$] (2.0 parts), 2-ethlhexyl acid phosphate oleylamine salt (0.5 part), polybutenyl succinate Lubrizol 948 (Lubrizol Corp.) (0.4 part), benzotriazole (0.05 part), p-octylphenylphenylamine (0.3 part), dodecyl acid phosphate (0.15 part) and polymerized alkylsiloxane DC-A (Dow Corning Corp.) (0.001 part) are incorporated into a mineral oil SAE 90 to make a total weight of 100 parts, whereby a gear lubricating oil composition is obtained.

EXAMPLE F

The S-containing organic phosphorus compound [I: $R^1 = R^2 = CH(CH_3)CH_2CH(CH_3)_2$; $R^3 = R^4 = H$; $R^5 = CH_2CH=CH_2$] (2.5 parts), polybutenyl succinimide "Oloa 1200N" (Chevron chemicals) (0.3 part), 2,6-di-t-butyl-α-dimethylamino-p-cresol (0.3 part), sulfurized olefin "Anglamol 32" (Lubrizol Corp.) (0.5 part), indazole (0.03 part), polymerized methylsiloxane DC-A (Dow Corning Co.) (0.001 part) and calcium petroleum sulfonate "Petrobase 210" (Penreco Inc.) (0.8 part) are incorporated into a mineral oil SAE 140 to make a total weight of 100 parts, whereby a gear lubricating oil composition is obtained.

EXAMPLE G

The S-containing organic phosphorus compound [I: $R^1 = R^2 = CH_2CH(C_2H_5)(CH_2)_3CH_3$; $R^3 = R^4 = H$; $R^5 = CH_2C_6H_5$] (1.5 parts), polybutenyl succinic acid pentaerythritol ester Lubrizol 936 (Lubrizol Corp.) (0.4 part), dibenzyl disulfide (0.5 part), p,p'-dioctyldiphenylamine (0.3 part), benzotriazole (0.03 part), a treated product of sulfurized fatty oil "Lubrizol 5006" (Lubrizol Corp.) (2.0 parts) with trilauryl phosphite (0.4 part) at 135°C for 40 minutes and lauryl acid phosphate (0.1 part) are incorporated into a mineral oil SAE 90 to make a total weight of 100 parts, whereby a gear lubricating oil composition is obtained.

EXAMPLE H

The S-containing organic phosphorus compound [I: $R^1 = R^2 = CH(CH_3)CH_2CH(CH_3)_2$; $R^3 = R^4 = H$; $R^5 = CH_2C_6H_5$] (2.0 parts), polybutenyl succinimide "Hitec 2636" (Edwin Cooper & Co., Ltd.) (0.4 part), a treated product of sulfurized olefin "Hitec E053" (Edwin Cooper & Co., Ltd.) (2.0 parts) with triisooctyl phosphite (0.4 part) at 130°C for 30 minutes, p-octyl phenylphenylamine (0.4 part), benzotriazole (0.05 part), octadecenyl succinic acid anhydride (0.1 part) and carboxylic ester "Lubrizol 859" (Lubrizol Corp.) (0.1 part) are incorporated into a mineral oil SAE 80 to make a total weight of 100 parts, whereby a gear lubricating oil composition is obtained.

EXAMPLE I

The S-containing organic phosphorus compound [I: $R^1 = R^2 = CH_2CH(C_2H_5)(CH_2)_3CH_3$; $R^3 = R^4 = H$; $R^5 = CH_2C_6H_5$] (0.7 part), polybutenyl hydroxybenzylamine Amoco 9000 (Amoco Chem.) (0.5 part), 2-methyl-5-vinylpyridine-alkyl methacrylate copolymer "ECA-531" (Exxon Chemicals) (5.0 parts), p,p'-dioctyldiphenylamine (0.4 part) and dilauryl phosphite (0.5 part) are incorporated into a 100 neutral oil to make a total weight of 100 parts, whereby a lubricating oil composition for automatic transmission fluid is obtained.

EXAMPLE J

The S-containing organic phosphorus compound [I: $R^1 = R^2 = CH_2CH(C_2H_5)(CH_2)_3CH_3$; $R^3 = R^4 = H$; $R^5 = CH_2C_6H_5$] (0.6 part), calcium didodecylbenzenesulfonate (3 parts), overbasic calcium phenate "Oloa 219" (Chevron Chemicals) (2 parts) and polymerized methacrylate "Plexol 150" (Rohm & Haas Co.) (0.2 part) are incorporated into a mineral oil SAE 30 to make a total weight of 100 parts, whereby a diesel engine lubricating oil composition is obtained.

EXAMPLE K

The S-containing organic phosphorus compound [I: $R^1 = R^2 = CH_2CH(C_2H_5)(CH_2)_3CH_3$; $R^3 = R^4 = H$; $R^5 = CH_2C_6H_5$] (2.0 parts), dibenzyl disulfide (0.35 part), polybutenylhydroxybenzylamine "Amoco 9250" (Amoco Chemicals) (0.45 part), dilauryl hydrogen phosphite (0.4 part), decyl acid phosphate (0.15 part), benzotriazole (0.03 part), polymerized alkylsiloxane DC-A (Dow Corning Corp.) (0.001 part), 4,4'-methylene-bis(2,6-di-t-butylphenol) (0.4 part) and polymerized methacrylate Plexol 150 (Rohm & Haas Co.) (0.1 part) are incorporated into a mineral oil SAE 90 to make a total weight of 100 parts, whereby a gear lubricating oil composition is obtained.

EXAMPLE L

The S-containing organic phosphorus compound [I: $R^1 = R^2 = CH_2CH(C_2H_5)(CH_2)_3CH_3$; $R^3 = R^4 = H$; $R^5 = CH_2C_6H_5$] (1.0 part), 2,6di-t-butyl-p-cresol (0.4 part), zinc diamyldithiocarbamate (0.2 part), carboxylic ester "Santolube 70A" (Monsanto Chem. Co.) (0.03 part), benzotriazole (0.02 part), polymerized methacrylate Plexol 150 (Rohm & Haas Co.) (0.1 part) and polymerized alkylsiloxane DC-A (Dow Corning Corp.) (0.001 part) are incorporated into a 150 neutral oil to make a total weight of 100 parts, whereby a lubricating oil composition for antiwear hydraulic fluid is obtained.

EXAMPLE M

The S-containing organic phosphorus compound [I: $R^1 = R^2 = CH_2CH(C_2H_5)(CH_2)_3CH_3$; $R^3 = R^4 = H$; $R^5 = CH_2C_6H_5$] (1.3 parts), p-octylphenylphenylamine (0.5 part), carboxylic ester Santolube 70A (Monsanto Chem. Co.) (0.05 part), benzotriazole (0.03 part), polymerized methacrylate Plexol 150 (Rohm & Haas Co.) (0.1 part) and polymerized alkylsiloxane DC-A (Dow Corning Corp.) (0.001 part) are incorporated into a 150 neutral oil to make a total weight of 100 parts, whereby a lubricating oil composition for antiwear hydraulic fluid is obtained.

The lubricating oil compositions as prepared in the above Examples were subjected to various tests for practical utilization. The results are shown in Tables 6 and 7.

Table 6

| Lubricating oil composition 1) | B | E | G | H | K |
|---|---|---|---|---|---|
| JIS 4 ball test 2) initial seizure IS load (kg) | 267 | 242 | 267 | 217 | 292 |

Table 6-continued

| Lubricating oil composition 1) | B | F | G | H | K | Gear oil A | Gear oil B | Gear oil C | Gear oil D |
|---|---|---|---|---|---|---|---|---|---|
| Shell 4 ball test 3) | | | | | | | | | |
| IS load (kg) | 158 | 141 | 141 | 126 | 178 | 242 | 217 | 267 | 242 |
| Welding load (kg) | 355 | 355 | 355 | 316 | 398 | 141 | 126 | 141 | 158 |
| LWI (kg) | 68.2 | 61.9 | 64.5 | 63.2 | 72.6 | 355 | 316 | 398 | 355 |
| | | | | | | 62.7 | 58.9 | 73.8 | 70.2 |
| Timken test 4) | | | | | | | | | |
| OK value (1h) | 40 | 45 | 55 | 40 | 40 | 45 | 40 | 50 | 45 |
| IAE test 5) | | | | | | | | | |
| failure load | 125 | 130 | 135 | 120 | 130 | 130 | 125 | 140 | 140 |
| 6000 rpm, 90°C (1h) | 140 | 135 | 150 | 130 | 150 | 145 | 135 | 150 | 140 |
| Copper corrosion test 6) 121°C, 3 hrs. | 1b | 1b | 2a | 2b | 1a | 2a | 1b | 2c | 2a |
| Steel corrosion test 7) | pass | pass | pass | pass | pass | pass | pass | fail | pass |
| Rust preventing test 8) 192 hrs. | pass | pass | pass | pass | pass | pass | pass | pass | pass |
| Humidity cabinet test 9) 100 hrs. | A | B | A | B | A | B | A | C | B |
| Falex pin corrosion test 10) | pass | pass | pass | fail | pass | borderline pass fail | pass | fail | pass |
| Indiana stirring oxidation test 11) 150°C, 48 hrs. | | | | | | | | | |
| Viscosity increase 37.8°C (%) | 7.2 | 8.4 | 7.7 | 9.2 | 5.4 | 9.4 | 8.7 | 16.1 | 6.5 |
| n-Pentane insoluble (% by weight) | 0.08 | 0.15 | 0.14 | 0.16 | 0.05 | 0.38 | 0.05 | 1.71 | 0.20 |
| Lacquer formation | none | trace | trace | light | none | heavy black | none | heavy brown | medium light |
| Steel strip surface | clear | clear | clear | black | clear | lacquer black and flaked | clear black heavy flaked | sludge black heavy flaked | sludge brown tarnish |
| Cu strip surface | dark brown black spot | black and light flaked | dark brown | black and light flaked | light brown | | | | |

Note:
1) The compositions B, F, G, H and K correspond respectively to those as prepared in Examples B, F, G, H and K. The gear oils A, B, C and D are the same as stated in Table 3.
2) JIS K2519-67.
3) ASTM D2783-71.
4) ASTM D2782-72.
5) IP (Institution of Petroleum) 166-68.
6) ASTM D130-68.
7) CS 3000B.
8) ASTM D665-68.
9) ASTM D1748-70.
10) IP 241-73T.
11) JIS K2514-72. Concerning to the viscosity increase and the n-pentane insoluble, reference is made to ASTM D445-72 and ASTM D893-69, respectively.

Table 7

| Lubricating oil composition 1) | L | M | X | Y |
|---|---|---|---|---|
| 4 Ball wear test scar diameter 2) (mm) | 0.38 | 0.40 | 0.41 | 0.42 |
| Turbine oil oxidation stability 3) (hrs to TAV 2.0 mgKOH/g) | >2000 | >3000 | >2000 | >2000 |
| Vickers 105C pump test 4) Cam ring wear (mg) | | | | |
| 100 hrs | 16 | 20 | 30 | 17 |
| 250 hrs | 26 | 29 | 45 | 28 |
| 1500 hrs | 58 | 78 | 110 | 180 |
| 4 Ball EP test 5) | | | | |
| IS load (kg) | 112 | 112 | 100 | 80 |
| Weld load (kg) | 200 | 224 | 200 | 178 |
| Cu corrosion test 6) 95°C, 1000 hrs | 1b | 2a | 1b | 2b |
| Turbine oil rust test 7) | pass | pass | pass | pass |
| Emulsion test 8) (ml(min)) | 40-40-0 (15) | 38-40-2 (25) | 40-40-0 (20) | 38-38-4 (30) |

Note:
1) The compositions L and M correspond respectively to those as prepared in Examples L and M. The composition X was prepared by incorporating zinc dialkyldithiophosphate "Oloa 267" (Chevron Chemicals) (1.5 %), 2,6-di-t-butyl-p-cresol (1.0 %) and carboxylic ester "Santolube 70A" (Monsanto Chem. Co.) (0.05 %) into a 150 neutral oil. The composition Y was prepared by incorporating a sulfur-phosphorus extreme pressure additive "Lubrizol 5105" (Lubrizol Corp.) (3 %) into a 150 neutral oil.
2) ASTM D2266-72.
3) ASTM D-943-68.
4) IP 281-72T.
5) ASTM D2783-71.
6) ASTM D130-68.
7) ASTM D665-68.
8) ASTM D1401-72.

From the above test results, it is understood that the lubricating oil compositions according to this invention show excellent properties for the practical utilization.

What is claimed is:

1. A sulfur-containing organic phosphorus compound of the formula:

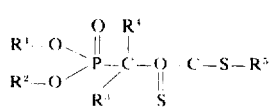

wherein $R^1$, $R^2$ and $R^5$ are each a hydrocarbon group and $R^3$ and $R^4$ are each a hydrogen atom or a hydrocarbon group having not more than 12 carbon atoms.

2. The sulfur-containing organic phosphorus compound according to claim 1, wherein $R^1$ and $R^2$ are each an alkyl group having not more than 12 carbon atoms, $R^3$ and $R^4$ are each a hydrogen atom and $R^5$ is a phenylalkyl group having not more than 12 carbon atoms.

3. The sulfur-containing organic phosphorus compound according to claim 2, wherein $R^1$ and $R^2$ are each an ethyl group, $R^3$ and $R^4$ are each a hydrogen atom and $R^5$ is a benzyl group.

4. The sulfur-containing organic phosphorus compound according to claim 2, wherein $R^1$ and $R^2$ are each an n-butyl group, $R^3$ and $R^4$ are each a hydrogen atom and $R^5$ is a benzyl group.

5. The sulfur-containing organic phosphorus compound according to claim 2, wherein $R^1$ and $R^2$ are each a secondary hexyl group, $R^3$ and $R^4$ are each a hydrogen atom and $R^5$ is a benzyl grooup.

6. The sulfur-containing organic phosphorus compound according to claim 2, wherein $R^1$ and $R^2$ are each a 2-ethylhexyl group, $R^3$ and $R^4$ are each a hydrogen atom and $R^5$ is a benzyl group.

7. The sulfur-containing organic phosphorus compound according to claim 1, wherein $R^1$ and $R^2$ are each an alkyl group having not more than 12 carbon atoms, $R^3$ and $R^4$ are each a hydrogen atom and $R^5$ is an alkenyl group having not more than 12 carbon atoms.

8. The sulfur-containing organic phosphorus compound according to claim 7, wherein $R^1$ and $R^2$ are each an n-butyl group, $R^3$ and $R^4$ are each a hydrogen atom and $R^5$ is an allyl group.

9. The sulfur-containing organic phosphorus compound according to claim 7, wherein $R^1$ and $R^2$ are each a secondary hexyl group, $R^3$ and $R^4$ are each a hydrogen atom and $R^5$ is an allyl group.

10. The sulfur-containing organic phosphorus compound according to claim 7, wherein $R^1$ and $R^2$ are each a secondary hexyl group, $R^3$ and $R^4$ are each a hydrogen atom and $R^5$ is a crotyl group.

11. The sulfur-containing organic phosphorus compound according to claim 7, wherein $R^1$ and $R^2$ are each a 2-ethylhexyl group, $R^3$ and $R^4$ are each a hydrogen atom and $R^5$ is an allyl group.

12. The sulfur-containing organic phosphorus compound according to claim 1, wherein $R^1$, $R^2$ and $R^5$ are each an alkyl group having not more than 12 carbon atoms and $R^3$ and $R^4$ are each a hydrogen atom.

13. The sulfur-containing organic phosphorus compound according to claim 12, wherein $R^1$ and $R^2$ are each an n-butyl group, $R^3$ and $R^4$ are each a hydrogen atom and $R^5$ is a sec.-butyl group.

14. The sulfur-containing organic phosphorus compound according to claim 12, wherein $R^1$ and $R^2$ are each a secondary hexyl group, $R^3$ and $R^4$ are each a hydrogen atom and $R^5$ is a tertiary butyl group.

15. The sulfur-containing organic phosphorus compound according to claim 12, wherein $R^1$ and $R^2$ are each a 2-ethylhexyl group, $R^3$ and $R^4$ are each a hydrogen atom and $R^5$ is a tertiary butyl group.

16. The sulfur-containing organic phosphorus compound according to claim 1, wherein $R^1$ and $R^2$ are each an alkyl group having not more than 12 carbon atoms, $R^3$ is a hydrogen atom, $R^4$ is an alkenyl group having not more than 12 carbon atoms and $R^5$ is a phenylalkyl group having not more than 12 carbon atoms.

17. The sulfur-containing organic phosphorus compound according to claim 16, wherein $R^1$ and $R^2$ are each a 2-ethylhexyl group, $R^3$ is a hydrogen atom, $R^4$ is a crotyl group and $R^5$ is a benzyl group.

18. The sulfur-containing organic phosphorus compound according to claim 1, wherein $R^1$, $R^2$, $R^3$ and $R^4$ are each an alkyl group having not more than 12 carbon atoms and $R^5$ is an alkenyl group having not more than 12 carbon atoms.

19. The sulfur-containing organic phosphorus compound according to claim 18, wherein $R^1$, $R^2$ and $R^4$ are each an ethyl group, $R^3$ is a methyl group and $R^5$ is an allyl group.

* * * * *

UNITED STATES PATENT OFFICE
CERTIFICATE OF CORRECTION

PATENT NO. : 3,901,932
DATED : August 26, 1975
INVENTOR(S) : Fusao Tada, et al

It is certified that error appears in the above-identified patent and that said Letters Patent are hereby corrected as shown below:

In the official Letters Patent columns 23 and 24 appear before columns 21 and 22. The columns of the Letters Patent are to be read in their numerical order.

Claim 5, line 4 "grooup" should read -group-.

Signed and Sealed this eleventh Day of November 1975

[SEAL]

Attest:

RUTH C. MASON
Attesting Officer

C. MARSHALL DANN
Commissioner of Patents and Trademarks